(No Model.)

F. D. TORRE.
MEANS FOR DISCLOSING OBSTACLES TO NAVIGATION.

No. 299,968. Patented June 10, 1884.

Witnesses:
L. C. Hills
W. B. Masson

Inventor
Frank Della Torre
by E. E. Masson
atty.

UNITED STATES PATENT OFFICE.

FRANK DELLA TORRE, OF BALTIMORE, MARYLAND.

MEANS FOR DISCLOSING OBSTACLES TO NAVIGATION.

SPECIFICATION forming part of Letters Patent No. 299,968, dated June 10, 1884

Application filed December 22, 1883. (No model.)

*To all whom it may concern:*

Be it known that I, FRANK DELLA TORRE, a citizen of the United States, residing at Baltimore, in the county of Baltimore and State of Maryland, have invented certain new and useful Improvements in Methods of and Means for Disclosing Obstructions to Navigation, of which the following is a specification, reference being had therein to the accompanying drawings, in which—

Figure 1:
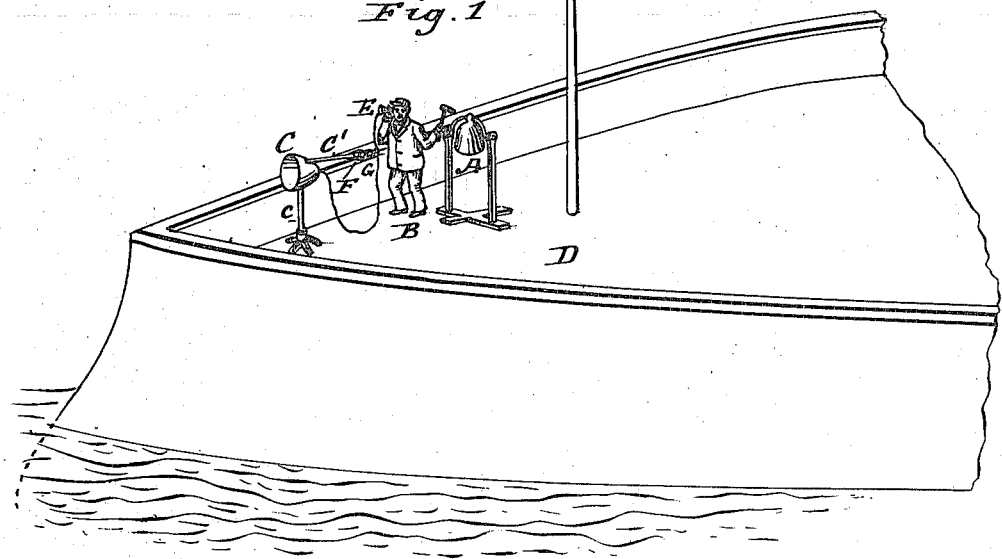
Figure 2:
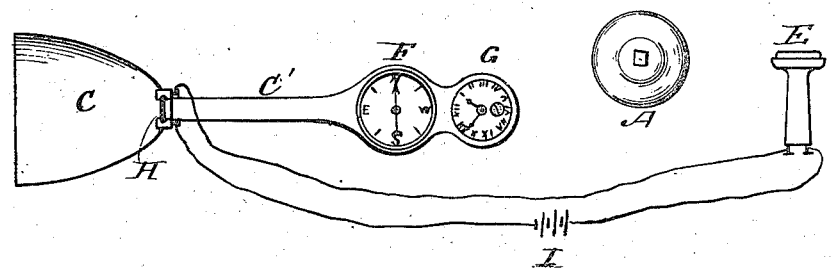

Figure 1 is a perspective of the prow of a vessel provided with an apparatus constructed in accordance with my invention and adapted to practice my method of ascertaining the direction of and distance to obstructions at sea or in navigable waters. Fig. 2 is a plan, partly in section, of the apparatus employed.

The object of my invention is to provide a method of ascertaining the presence of obstructions to navigation and to determine their direction and distance from the point of observation.

The principle of my invention involves the use of the echo as a danger-signal. The temperature and pressure of the atmosphere being known, the distance from a point of observation of any solid body is a mere matter of computation, the velocity ranging from about eleven hundred feet per second upward, according to the temperature and pressure, so that if a sound is produced on board of a vessel and reverberated by any solid body, a simple mental or other calculation of the time intervening between the production of the sound and the return of the echo is only necessary to determine the distance. The use of this method is applicable for ships in foggy weather to detect the presence of icebergs or of other vessels, the near proximity of land or other obstacles to safe navigation, and for coast and harbor use to detect the approach of a man-of-war or other vessel, and also torpedoes or boats to a ship moving or at anchor, and upon rivers to detect the approach or passage of smugglers. The method depending solely upon the sense of hearing is available when it is most needed—that is, at night and in thick and foggy weather.

The principal devices employed in the practice of my method are a sound-producer, a sound-collector, a time-piece, and a compass, the first two being essential, and the remainder advantageous adjuncts.

A represents a sound-producer, which in this instance is a bell, which upon being struck by a naval officer or any other operator stationed at B produces a sound, which, when returned as an echo by any obstacle, is received at a collector or sound-receiver, C, pivotally supported upon any suitable standard, c, which with the remaining devices of the apparatus are arranged upon the bow D or any other suitable part of a vessel. A mechanical or other telephone, E, may be connected with the sound-collector and applied to the ear of the observer for detecting the more indistinct echoes received from long distances or from sound-reverberating objects by repercussion of sound. From the sound-collector may project an arm, C', which is adapted to serve as a support for a compass, F, and a time-piece, G, indicating seconds and division thereof, whereby when the sound-collector is turned toward the source of the echo-producing object the direction may be read from the compass and the time of the return of the echo may be indicated by the time-piece.

If desired, an ordinary mechanical-telephone diaphragm may be placed in the focus of the parabolic receiver or sound-collector C, herein shown; but for the surer detection of the faintest echoes I prefer to insert in said focus the principal elements of a microphone, as shown at H, said elements being suitably connected in the electrical circuit of a battery, I, which is also suitably connected with the telephone-receiver E. The electric battery, compass, chronometer, and the telephone-receiver may be placed under the deck and used in the cabin or at any distance from the bow of the vessel, and the sound-producing bell or a steam-whistle may also be operated by means of wires from the same locality, and to exclude as much as possible all sound of machinery or other noise except the distant reverberations received by the apparatus the receiving-room may have its walls suitably padded.

I am aware that parabolic funnels have been used to collect sounds, and that ordinary trumpet-shaped sound-collectors have been placed in communication by means of tubes with one or both ears of persons to increase the volume of sound received.

Having described my invention and one arrangement of devices for practicing the same, what I claim as new, and desire to secure by Letters Patent, is—

1. The combination of a sound-producing device, as described, and a microphone sound-collecting device pivotally supported and provided with wires for transmitting sound to a suitable receiver, with a compass, substantially as and for the purpose described.

2. The combination of a sound-producing device, as described, a microphone sound-collecting device pivotally supported, a telephonic receiver, and an electric battery, a compass, and a time-piece, all located upon the same vessel and under control of one operator, substantially as and for the purpose described.

In testimony whereof I affix my signature in presence of two witnesses.

FRANK DELLA TORRE.

Witnesses:
THOS. KELL BRADFORD,
BERNARD A. BOGGE.